US006580462B2

(12) United States Patent
Inoue et al.

(10) Patent No.: US 6,580,462 B2
(45) Date of Patent: *Jun. 17, 2003

(54) TELEVISION BROADCAST RECEIVING SYSTEM (75) Inventors: Hajime Inoue, Chiba (JP); Shinji Kakuyama, Tokyo (JP); Sunao Furui, Kanagawa (JP); Susumu Nagano, Kanagawa (JP)

(73) Assignee: Sony Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/252,888

(22) Filed: Feb. 18, 1999

(65) Prior Publication Data
US 2002/0047938 A1 Apr. 25, 2002

(30) Foreign Application Priority Data
Feb. 19, 1998 (JP) .............................. 10-037007

(51) Int. Cl.[7] ........................ H04N 11/00; H04N 7/00
(52) U.S. Cl. ................. 348/460; 348/473; 725/132; 725/140
(58) Field of Search .................. 348/460, 461, 348/462, 465, 467, 473, 482, 484; 386/83

(56) References Cited

U.S. PATENT DOCUMENTS

| | | | | | |
|---|---|---|---|---|---|
| 5,414,756 | A | * | 5/1995 | Levine | 348/7 |
| 5,473,609 | A | * | 12/1995 | Chaney | 348/460 |
| 5,488,409 | A | * | 1/1996 | Yuen et al. | 348/5 |
| 5,541,662 | A | * | 7/1996 | Adams et al. | 348/460 |
| 5,768,539 | A | * | 6/1998 | Metz et al. | 348/7 |
| 5,856,852 | A | * | 1/1999 | Huh | 348/460 |
| 5,949,954 | A | * | 9/1999 | Young et al. | 386/83 |
| 6,008,802 | A | * | 12/1999 | Iki et al. | 348/460 |

* cited by examiner

Primary Examiner—John Miller
Assistant Examiner—Trang U. Tran
(74) Attorney, Agent, or Firm—Lerner, David, Littenberg, Krumholz & Mentlik, LLP (57) ABSTRACT A television receiver apparatus has large versatility to adapt itself to newly offered services or new modes of use. An external memory element loaded with a flash memory is connected to the receiver apparatus through an external memory interface having a connector and an interface circuit. The external memory element stores information such as a program for implementing an additional function or data such as video and audio data. The information stored in the external memory element is taken up by the receiver apparatus through the external memory interface. The information from the external memory element is processed by a controlling portion of the receiver apparatus so as to be subjected to use.

24 Claims, 5 Drawing Sheets

TELEVISION BROADCAST RECEIVING SYSTEM

BACKGROUND OF THE INVENTION

1. Field of the Invention

The present invention relates to a television broadcast receiving system for receiving television broadcasting signals such as of digital satellite broadcasting service.

2. Description of the Related Art

In recent years, broadcasting services under new broadcasting systems such as analog and digital broadcasting systems using geostationary satellites are available, and are finding spearing use in addition to conventional broadcasting services relying on ground waves.

For instance, a geostationary satellite digital broadcasting system employs data compression technique such as MPEG for compressing data of a plurality of television broadcasting programs, and sends the compressed data of plural programs by multiplexing these data on a single carrier wave, thus offering television broadcasting service in a way that is different from that for the conventional television broadcasting services employing ground waves.

The digital broadcasting service can also supply users with various kinds of digital data such as game programs and contents information described by MHEG (Multimedia and Hypermedia Information Coding Experts Group), by inserting such digital data into broadcast signals and broadcasting the signals together with these data.

Thus, new types of services are recently offered in which various kinds of data are furnished through a digital television broadcasting system using geostationary satellite (referred to simply as "digital television broadcasting", hereinafter), in addition to ordinary television broad casting programs. In order that the user can enjoy such a new type of service, the receiving system has to be equipped with a function for enabling the use of various kinds of data furnished by the broadcasting service.

Such a function, however, is not needed by users who do not with to utilize various kinds of data supplied in addition to the ordinary broadcasting program signals. Provision of the function for enabling use of such additional data undesirably raises the cost of the television receiver, thus heavily burdening the potential users.

It is reasonable to consider that introduction of new technologies will bring about novel services that could not be rendered heretofore. Since the nature and fashion of such future novel service are still unknown, it is impossible to modify the existing digital television broadcast receivers in such a way as to adapt them to such new type of services.

When such a new service is commenced in the future, the users, if wish to enjoy the new service, will be obliged to take burden of purchasing new receivers that are adapted to cope with such a new service, while disposing of the old receivers wastefully.

SUMMARY OF THE INVENTION

The present invention provides a television broadcast receiving system that can versatility adapt itself to new services which will be rendered in the future and new fashion of use of television broadcasting that will become available in the future.

According to the present invention, there is provided a television receiver apparatus, comprising: a connector for connecting an external memory to the receiver apparatus; an interface circuit for enabling taking up of information from the external memory connected through the connector; and a control circuit for processing information taken up from the external memory through the interface circuit to enable use of the information.

In accordance with these features, the external memory is connected to the receiver apparatus through the connector, so that the information stored in the external memory is read through the interface circuit. The information read from the external memory is then processed by the control circuit so as to be subjected to use.

By reading the information stored in the external memory and conducting processings corresponding to the read information, it is possible to use the read information itself or to execute a new function based on the information read from the external memory.

The arrangement may be such that the control circuit is enabled to execute a new function, based on the information taken up from the external memory connected to the connector.

With this feature, the receiver apparatus can execute a new function which otherwise could not be implemented, by virtue of the use of the information read from the external memory.

It is thus possible to add a new function by processing information read from the external memory. For instance, an existing receiver apparatus can easily be adapted to a new service offered by a television broadcasting service, without requiring substantial investment.

The information taken up from the external memory may be video data or audio data. The video data or the audio data taken up from the external memory is subjected to a reproducing processing under the control of the control circuit, whereby an image corresponding to the video data is displayed on a display device or the sound corresponding to the audio data is reproduced.

In accordance with these features, the external memory connected to the receiver apparatus through the connector stores video or audio data. These data are taken up through the interface circuit and are subjected to reproduction processing under the control of the control circuit.

With these features, it is possible to reproduce image or sound information from the video or audio data that has been recorded in the external memory by means of an external device such as a digital still camera, whereby the user can enjoy the image or the sound.

The information taken up from the external memory may comprise, in addition to the video or audio data, information for enabling reproduction from the video data or audio data. In such a case, the control circuit performs a control operation including: taking up the information for enabling reproduction from the video data or the audio data prior to the taking up of the video data or the audio data; and reproducing the image or the sound from the video data or the audio data by using the information for enabling reproduction.

More specifically, the external memory may store, for example, video or audio data compressed in a predetermined compression technique. In such a case, information for enabling production from the video or audio data, such as a decompression program corresponding to the compression technique, is stored in the external memory together with the compressed video or audio data.

Prior to the reading of the compressed video or audio data, the control circuit reads and processes the information to be used for the reproduction of image or sound from the video or audio data, thereby enabling the function for reproduction from the video or audio data. The video or audio data is then read from the external memory and is processed by the enabled reproducing function.

Thus, the reproducing function for reproduction from the video or audio data to be read from the external memory is enabled prior to the reading of the video or audio data. Thus, even if the receiver apparatus is not initially equipped with the function for reading and processing video or audio data, such a function is additionally implemented by the information read from the external memory, so that the receiver apparatus can read and process such video or audio data.

The information taken up from the external memory may comprise information for setting up means for extracting data inserted in broadcast signals. In this case, the control circuit performs a control operation to enable a processing for extracting the data inserted in the broadcast signals by using the information taken up from the external memory.

In accordance with these features, a function for extracting data inserted in broadcast signals can be additionally implemented by using information read from the external memory.

This additional function makes it possible to extract and use data such as contents information inserted in the broadcast signals.

The television receiver apparatus may further comprise an additional connector for connection of another external memory or an external device. In this case, the control circuit performs a control operation to enable transfer of the information from the external memory to the another external memory or to the external device via the additional connector.

Thus, the information read from the external memory can be transferred to another external memory or to an external device, by the operation of the control circuit.

This feature enables the information stored in the external memory to be recorded in another external memory or in a different recording medium via an external device. This contributes to enhancement of environmental condition for the use of digital data, thus allowing more effective and wider use of a variety of types of digital devices.

The control circuit may perform a control operation including: enabling a display section to display the contents of the information taken up from the external memory; and enabling the transfer to the another external memory or to the external device of only selected data selected in accordance with a selection instruction given by the user out of the data constituting the information.

In accordance with these features, the control circuit enables an at-a-glance display indicative of the contents of information stored in the external memory. For instance, an at-a-glance list of a plurality of data stored in the external memory is displayed to enable the user to select specific data. Only the selected data is transferred to another external memory or to an external device.

It is thus possible to select data out of a plurality of data stored in the external memory, and to transmit only the selected data to another external memory or external device for the storage purpose. Since another external memory or the storage medium associated with an external device is required to store only digital data that are designated as being necessary, whereby the necessary data can be handled in a neat manner and administrated in an efficient manner.

The information taken up from the external memory may comprise one or more frames of still video images. In this case, the control circuit performs a control operation including; enabling the information from aid external memory to cause the display section to display images formed by the still video data; and enabling the transfer to the another external memory or to the external device of only selected video data selected in accordance with a selection instruction given by the user.

In accordance with these features, the control circuit enables the images formed by the video data read from the external memory to be displayed on the display section, and only the video data corresponding to the images selected by the user from among the displayed images are transferred to another external memory or an external device.

It is therefore possible to select still video data corresponding to required still images, from among a plurality of still video data recorded in the external memory by, for example, a digital still camera. The selected video data are transferred to another external memory or an external device so as to be edited in such another external memory or in a storage medium associated with the external device, whereby a so-called electronic album is formed.

DESCRIPTION OF THE PREFERRED EMBODIMENTS

An embodiment of the television receiving system in accordance with the present invention will be described with reference to the accompanying drawings, on an assumption that the television receiving system is used for receiving digital television broadcast signals. Digital television broadcasting service is available in which signals of a plurality of broadcasting programs are transmitted by being multiplexed on a common carrier wave. It is therefore assumed here that the digital television broadcast receiving system which will now be described is adapted to receive and demodulate signals of a plurality of broadcast programs that have been multiplexed to a single carrier wave, thus extracting and using signals of a desired broadcast program.

Figure 1:
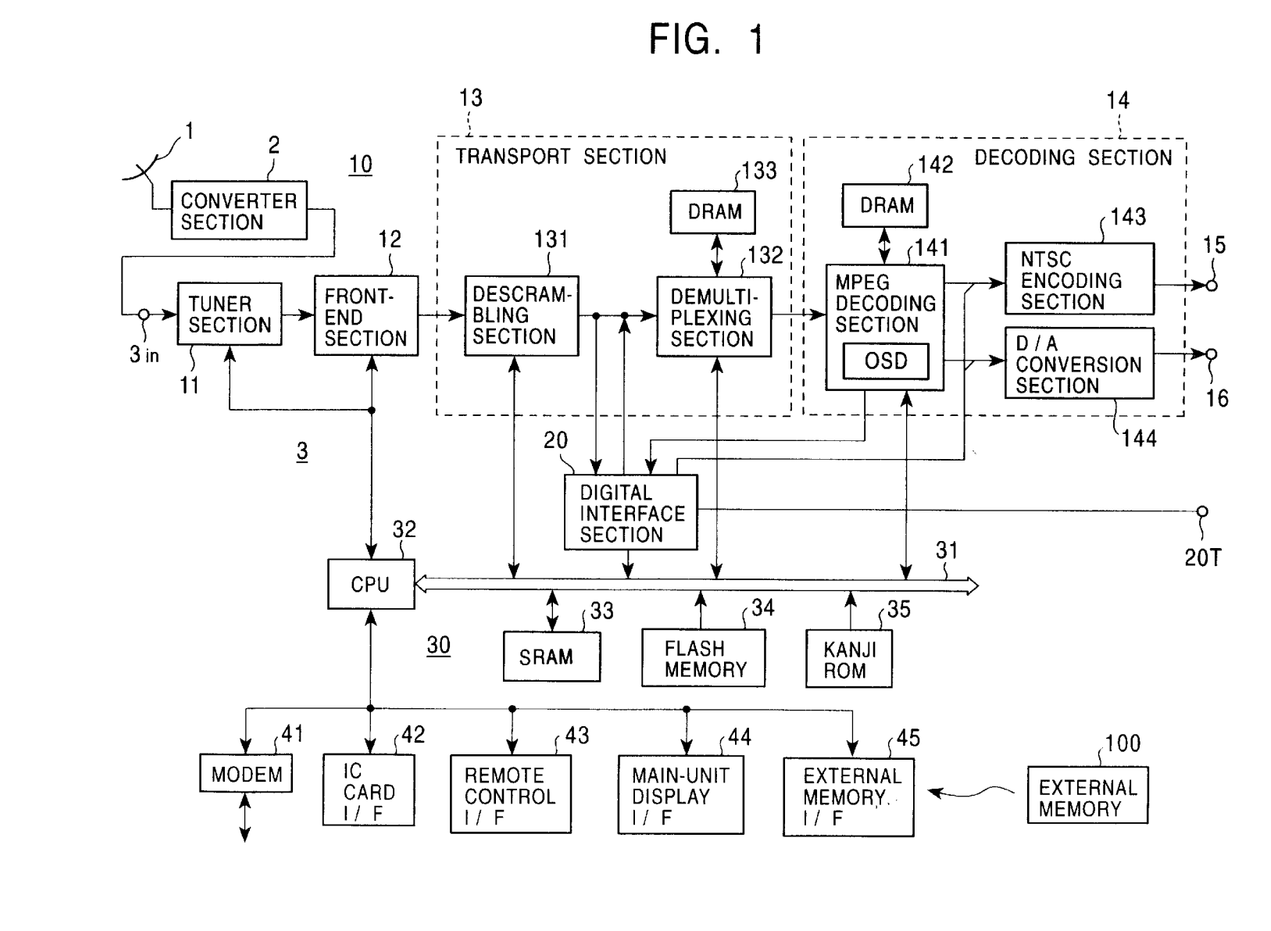
FIG. 1 is a block diagram illustrative of an embodiment of the digital broadcast receiving system in accordance with the present invention.

FIG. 1 is a block diagram showing the configuration of a television broadcast receiving system (referred to simply as a "receiver", hereinafter) embodying the present invention. Referring to this Figure, satellite broadcasting waves of 12 GHz band, received by a receiver antenna 1, are frequency-converted into intermediate-frequency wave signals of 1 GHz band. These intermediate-frequency wave signals are input to the receiver 3 of the embodiment, via an input terminal "in" denoted by 3.

The receiver 3 is roughly divided into a received signal processing portion generally denoted by 10, a digital interface portion generally denoted by 20 which permits exchange of digital data between the receiver 3 and an external digital device, and a controlling portion generally designated at 30. The received signal processing portion 10 includes a tuner section 11, a front-end section 12, a transport section 13 and a decoding section 14. As will be described later, the received signal processing portion 10 performs processings such as demodulation of a carrier that has been received and selected, thereby outputting video and audio signals for reproducing a broadcast program that has been selected in accordance with instructions given by a user.

The controlling portion 30 includes a microcomputer to which connected through a BUS 31 are a CPU 32, an SDRAM 33, a flash memory 34 and a KANJI ROM 35. The controlling portion 30 controls operations of various parts of the receiver 3. The SDRAM 33 is used as a work area for various processings that are conducted in the controlling portion 30. The flash memory 34 stores programs and data used for various processings that are conducted in the controlling portion 30. The KANJI ROM 35 stores font data for displaying characters and symbols, including KANJI font data.

Connected also to the controlling portion 30 are a MODEM 41, an IC card interface 42(IC CARD I/F in FIG. 1), an interface 43 (REMOTE CONTROL I/F in FIG. 1) for communication with a remote commander, an interface 44 (MAIN-UNIT DISPLAY I/F in FIG. 1) for connection to fluorescent tubes on a main unit, and an interface 45 (EXTERNAL MEMORY I/F in FIG. 1) for communication with an external memory.

The interface for connection to the MODEM 41, IC card interface 42, remote control interface 43, main unit display interface 44 and the external memory interface 45 are arranged in a so-called gate array which is implemented by a single LSI. Use of the gate array arrangement consolidating a plurality of different interfaces permits the receiver of the embodiment to be equipped with such a plurality of interfaces at a low cost.

In this embodiment, the tuner section 11 is implemented as a synthesizer-type tuner which receives PLL data as a channel selection control signal, i.e., data concerning demultiplication factor of a frequency-dividing circuit of a PLL loop. Although not shown, a memory for storing PLL data corresponding to the respective channels is provided in the controlling portion 30.

Upon receipt of PLL data as the channel selection control signal from the controlling portion 30, the tuner section 11 selects one of the carriers contained in the intermediate-frequency signals input through the input terminal "in" 3. The carrier to be selected is determined by a remote control signal corresponding to a channel selection command given by a remote commander (referred to as "remote controller") in accordance with an input operation performed by the user.

Thus, operation of the remote controller by the user for inputting the channel selection command causes a corresponding remote control signal to be emitted from the remote controller. The remote control signal is delivered to the controlling portion 30 of the receiver 3, via the remote control interface 43 connected to the controlling portion 30, whereby PLL data corresponding to the remote control signal is supplied to the tuner section 11. Although not shown, the receiver 3 is equipped with operation button keys through which the user inputs the channel selection command.

The output from the tuner section 11 is supplied to the front-end section 12 which includes an A/D converter, a demodulating section, a channel equalizer, and an error correction decoding section. The front-end section 12 converts the signals coming from the tuner section 11 into digital signals and conducts digital demodulation.

The front-end section 12 also performs so-called ghost canceling on the digitally-demodulated signals, based on control information derived from the controlling portion 30, and performs also correction of bit error occurring along the transmission path, thereby providing a transport stream output. In case of satellite digital broadcasting, strong error correction codes are employed in order to ensure high quality of received data even under a low C/N receiving condition due to, for example, rain fall. For instance, Viterbi code, Reed Solomon-product code and Trellis coding modulation are employed.

Thus, the front-end section 12 performs demodulation and error correction processing, and sends the resultant transport stream output to the transport section 13. For the purpose of restricting the receipt as in the case of paid broadcasting, most part of the transport stream is composed of scrambled signals.

As will be seen from FIG. 1, the transport section 13 includes a descrambling section 131, demultiplexing section 132, and a DRAM 133 which is used as a work area for demultiplexing processing. The transport stream output from the front-end section 12 is delivered to the descrambling section 131 of the transport section 13. The descrambling section 131 performs a processing to descramble the transport stream.

In order that the descrambling of the transport stream signals be performed by the descrambling section 131, the user connects to the IC card interface 42 an IC card that is furnished through a contract from the digital television broadcasting company. The IC card stores information concerning individual user such as the terms of the contract. Such information concerning individual user, e.g., terms of the contract, stored in the IC card can be updated through a communication with, for example, an accounting center of the broadcasting company, via the MODEM 41.

As will be described later, a descrambling key is one of plurality of kinds of data that are necessary for limited receipt of broadcast signals that have been supplied by being multiplexed in the transport stream and that are extracted by the demultiplexing section 132. The controlling section 30, upon receipt of the descrambling key, determines whether the descrambling of the transport stream signals on the receiver 3 in receipt of the signals has been authorized, based on the contract information carried by the IC card. If such descrambling has been authorized by the contract, the descrambling key from the demultiplexing section 132 is supplied to the descrambling section 131, whereby the transport stream signals are descrambled legally.

The descrambled transport stream still has the form of a multiplex information in which a multiplicity of programs of different channels are multiplexed and, therefore, is sent to the demultiplexing section 132. As will be described later in more detail, the transport stream is also supplied to the digital interface section 20 that enables the transport stream and other data to be supplied to external digital devices.

Figure 2:
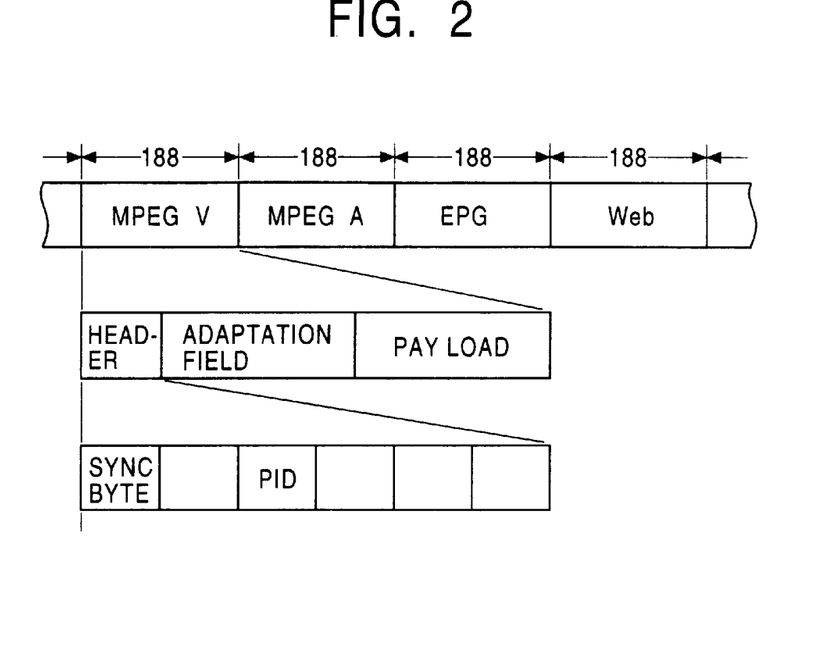
FIG. 2 is a diagram illustrating a transport stream employed in digital broadcasting service.

FIG. 2 shows the configuration of the transport stream in which a multiplicity of programs have been multiplexed. As will be seen from this Figure, the transport stream is a bit string defined by MPEG system, and is an assembly of fixed-length packets of 188 bytes. Each packet will be referred to as a "transport packet".

Each transport packet has a header, an adaptation field for enabling entry of additional information to a specific packet, and a payload that represents the contents of the packet. The payload contains data of programs or television programs that are to be selected and used by the user. Examples of such data are MPEG-compressed video signals (MPEG V), MPEG-compressed audio signal (MPEG A), and so-called home-pages and game programs formed in accordance with aforesaid MHEG or HTML (Hyper Text Makeup Language). These data are collectively represented by "Web" in FIG. 2.

Transport packets, that contain data to be used for channel selection, data such as descramble key necessary for limited receiving and service information data for implementing EPG (Electronic Program Guide, i.e., a table of television programs), are also multiplexed with transport packets containing the program data. Thus, the transport stream is a multiplex data in which are multiplexed packets of data of a plurality of programs (or television programs) and packets containing data concerning channel selection and limited receiving, as well as the service information data.

In each packet, the header is composed of 4 bytes headed by a synchronizing byte which is followed by a packet ID (PID) identifying the packet and control information indicating presence or absence of scramble, adaptation field and payload.

The demultiplexing section 132 performs demultiplexing processing in accordance with the program selection instruction which is input by the user by means of the remote controller via the remote control interface 43 of the controlling portion 30. This demultiplexing processing separates and extracts packets of interest such as packets containing MPEG-compressed video signals of the program selected by the user, MPEG-compressed audio signals of the selected program, data concerning program selection and limited receiving, service information data, and so on.

Figure 3:
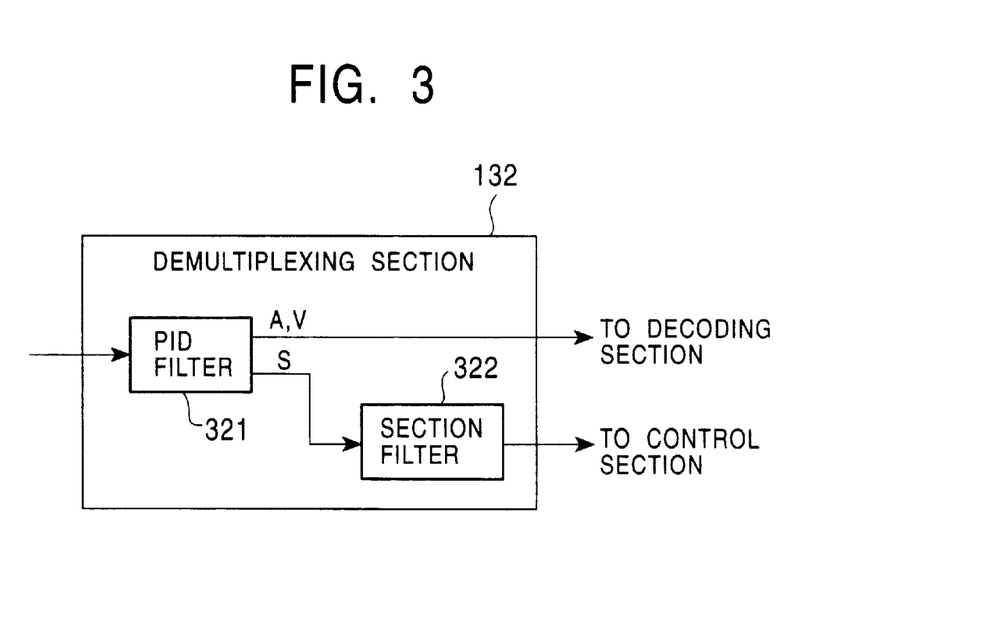
FIG. 3 is a block diagram of a demultiplexing section of the receiving system shown in FIG. 1.

FIG. 3 is a block diagram showing the configuration of the demultiplexing section 132. The demultiplexing section 132 has a PID filter 321 and a section filter 322. The PID filter 321 extracts the MPEG-compressed video signals V and MPEG-compressed audio signals A of the program (or broadcast television program) selected by the user, based on the PID added to the header of each transport packet, and separates and extracts also various data S such as data that pertains to program selection and limited receiving.

The demultiplexing section 132 also performs, based on the synchronizing bit, reproduction of a program clock reference that serves as a reference for the synchronous reproduction of video and audio signals.

The video signals V and audio signals A of the program (or broadcast television program) designated by the program selection made by the user is supplied to the decoding section 14, while the data S is delivered to the section filter 322 which separates and extracts necessary data such as data concerning the program selection and limited receiving. The extracted data is delivered to the controlling portion 30.

As shown in FIG. 1, the decoding section 14 is provided with an MPEG decoding section 141, DRAM 142 which serves as a work area for the MPEG decoding processing, NTSC encoding section 143, and an audio signal D/A conversion circuit 144.

As stated before, the video signals and audio signals of the program (or broadcast television program) selected by the user have been MPEG-compressed. Therefore, the MPEG decoding section 141 conducts decompressing processing, i.e., MPEG decoding processing, of the MPEG-compressed video and audio signals derived from the demultiplexing section 132.

The MPEG decoding section 141 has an OSD (on-screen display) function which enables EPG and menu to be superposed on the video image of the program (or broadcast television program) so as to be displayed together with the video image in superimposed manner.

The decompressed video signals are supplied to the NTSC encoder 143 so as to be converted into analog video signals that follow NTSC system. The video signals in the form of NTSC analog signals are delivered to a monitor receiver through an external output terminal 15, whereby video images are displayed on the display screen of the monitor receiver.

In the meantime, the decompressed audio signals are supplied to the audio signal D/A conversion circuit 144, so as to be converted into analog audio signals. The analog audio signals are supplied to a speaker of the monitor receiver for example, through an external output terminal 16, whereby voices and sounds are reproduced through the speaker.

In this embodiment, the digital video and audio signals decompressed in the MPEG decoding section 141 are supplied also to the digital interface portion 20 that enables these signals and the transport stream to be delivered to external devices.

The digital interface portion 20 forms output data from the data processed by the receiver 3 of this embodiment and delivers the output data to external digital devices through the external I/O terminal 20T. The digital interface section 20 also performs processing for converting data received from external digital devices through the external I/O terminal 20T into data of the form that can be processed by the receiver 3 and for accepting such converted data. Thus, the digital interface section 20 provides interfaces for the digital signals that are output from the receiver 3 to external digital devices and digital signals that are received by the receiver 3 from external digital devices.

In this embodiment, the I/O terminal 20T is an IEEE-1394 I/O terminal that complies with the interface standards of IEEE (Institute of Electrical and Electronics Engineers). Thus, digital data can be exchanged between the receiver 3 in this embodiment and external digital devices such as a DVTR, a hard disk device (referred to as "AVHDD device") capable of recording and reproducing digital video and audio signals, MD device, or the like.

As described before, the digital interface section 20 receives a multi-program transport stream containing MPEG-compressed video and audio signals derived from the descrambling section 131 and corresponding to a plurality of broadcast programs. The digital interface section 20 also receives digital video and audio signals of a single broadcast program separated and extracted from the transport stream by the demultiplexing section 132 and decompressed by the MPEG decoding section 141.

The digital interface section 20 of the receiver 3 is adapted to operate under the control of the controlling portion 30 in accordance with user's instructions, so as to supply an external device with one of the following three types of signals: a transport stream; both the digital video and audio signals; and the digital audio signal alone, via the I/O terminal 20T.

In addition, the receiver 3 of this embodiment is designed such that an external memory 100 is detachably connected thereto through the external memory interface 45. Thus, in this embodiment, the external memory interface 45 has a connector to which the external memory 100 is connectable, and an interface circuit through which data is exchanged between the receiver 3 and the external memory 10.

External rewritable external devices that have flash memories and that can be mounted and demounted on and from various electronic devices are connectable to the external memory interface 45.

Thus, the external memory element 100 can store programs and various digital data such as video and audio data, and permits reading of such programs and data as required. The types of data stored in the external memory element 100 can be known from information stored in a predetermined portion of the external memory element, e.g., in a header portion.

In this embodiment, when the external memory element 100 is connected to the receiver 3 through the external memory interface 45, the receiver 3 can upgrade its function by using data read from the external memory element 100 connected thereto or reproduce and output video and audio data read from the external memory element 100.

The receiver of this embodiment is also capable of checking various kinds of information provided by digital broadcasting service and storing such information in the external memory element 100. A description will now be given of various types of functions that become available as a result of connection of the external memory element 100 to the external memory interface 45.

[Upgrading of Functions Enabled by the External Memory Element 100]

As explained before, digital television broadcasting service can furnish also contents information such as a home page formed in MHEG or HTML. Such contents information, however, cannot be used unless a program known as a browser is used. It is therefore necessary that the receiver 3 is equipped with a browser.

It is to be noted, however, not all of the users wish to obtain the contents information. There are many users who wish to enjoy only ordinary television broadcast programs.

Therefore, the receiver 3 is equipped with a basic function for enabling the user to watch and listen to ordinary television broadcast programs, whereas the function for enabling acquisition and use of contents information is optionally furnished as an additional function by the external memory element 100.

Thus, a user who wishes to use contents information provided by the digital television broadcasting service purchase an external memory element 100 that stores a browser and other necessary programs and data that are necessary for obtaining the contents information. The function for obtaining and using such contents information becomes available simply by connecting the external memory element to the external memory interface 45.

The browser and other programs and data stored in the external memory element 100 connected to the external memory interface 45 are taken up by the receiver 3. In this case, the programs and data stored in the external memory element 100 are additionally written in the flash memory 34 by the operation of the controlling portion 30.

The receiver 3 then executes programs such as the browser additionally written in the flash memory 34, whereby the user can obtain and use the contents information provided by the digital television broadcasting services. Thus, a new function can be implemented on the receiver 3 by the additional registration of programs that are not inherently loaded on the receiver 3.

There may be a case where it is not necessary to retain the programs such as the browser on the flash memory 34 because the demand for the contents information does not occur so frequently. In such a case, the external memory element 100 storing the programs such as the browser is connected to the external memory interface 45 only when the contents information is needed, and the programs and data necessary for obtaining and using the contents information are copied from the external memory element 100 into the SDRAM 33. By executing the software copied and held in the SDRAM, it is possible to take up and execute a desired software whenever necessary.

When the power supply of the receiver 3 is turned off, the programs and other copied and held on the SDRAM 33 are extinguished without being retained. Therefore, if the power supply of the receiver 3 has been turned off, the programs and other data are copied once again from the external memory element 100 into the SDRAM 33 and executed.

The above-described addition of function realized by the use of the external memory element 100 is only illustrative. For instance, in this embodiment, it is possible to replace all the programs and data stored in the flash memory 34 with those stored in the external memory element 100 or to substitute programs and data stored in the external memory element 100 for part of the programs and data stored in the flash memory 34.

Thus, extension of functions of the receiver 3 and addition of functions to the same are possible whenever required, by the use of the external memory element 100. This advantageously enables the user to enjoy any new kind of service which may become available in the future, by using existing receiver 3, simply by adding a new function that enables the user to enjoy such a new service and that is provided by a new external memory element 100. This relieves the user from the burden of purchasing a new receiver 3, thus eliminating necessity of wasting of the existing receiver.

It is conceivable that a specific type of information such as map information or stock price information is inserted in digital broadcast signals so as to be used only by specific user who needs such information. In such a case, the user purchases an external memory element 100 that stores a program for enabling extraction and use of the specific type of information contained in the digital broadcast signals and connects the external memory element 100 to the external memory interface 45.

The user then copies the program stored in the external memory element 100 into, for example, the SDRAM 33. The controlling section 30 then controls, for example, the demultiplexing section 132, by executing the program copied in the SDRAM 33, whereby the objective information of interest contained in the digital broadcast signals is extracted. It is possible to display the extracted objective information as it is or after any necessary processing performed by the controlling portion 30, by using the OSD function of the MPEG decoding section 141.

Thus, the program recorded in the external memory element 100 serves as means provided in the receiver 3, for extracting objective data inserted in broadcast signals.

Additional registration of the program stored in the external memory element 100 into the flash memory 34 as described before is possible also in the above-described case where the function for extracting specific type of information is implemented by the use of the program stored in the external memory element 100. The arrangement may be such that, when a program has been added to the flash memory 34, a list of processings executable by the program stored in the flash memory 34, i.e., a menu, is displayed to enable the user to select one of the processings. Thus, the user can execute the added program whenever necessary. This applies also to the case where the program added to the flash memory 34 is a browser.

In order to cope with a future demand for extending functions, the receiver of this embodiment may be so configured as to enable various types of circuits to be implemented in the receiver 3, by using programmable logical circuits such as the field programmable gate array (FPGA) or a programmable logic device (PLD). In such a case, an external memory element 100 storing circuit connection information concerning the form of connection of the programmable logical circuits is used and connected to the external memory interface 45. The controlling portion 30 reads the circuit connection information, and changes the form of connection of the programmable logical circuits in accordance with the read circuit connection information, whereby the connection between the programmable logical circuit is altered adapting to the new function.

[Reproduction of Data Such as Video Data Stored in the External Memory 100]

The external memory element 100 may be, for example, a recording medium for use on a digital still camera. In such a case, the external memory element 100 can record still video data and audio data picked up at the time of photographing. It is desirable that, when the external memory element 100 storing information including still video data and audio data is connected to the external memory interface 45, the information be taken into the receiver 3 and reproduced by the receiver 3. This arrangement enables the user to observe on the receiver 3 the still video image taken up by the digital still camera, thus enabling an effective use of the still video data stored in the external memory element 100.

More specifically, the receiver 3 of this embodiment may be so constructed as to reproduce still video data recorded in the external memory element 100 when such external memory element 100 containing such still video data is connected to the receiver 3, in a procedure which will now be described.

When an external memory element 100 storing still video data is connected to the external memory interface 45, the controlling portion of the receiver 3 operates under the control of the CPU 32 so as to copy the still video data stored in the external memory element 100 into the SDRAM 33.

In general, still video data recorded in the external memory element 100 by a digital still camera has been compressed in accordance with JPEG method. In order to reproduce the recorded still video data, therefore, it is necessary to decompress the still video data. Therefore, the controlling portion 30 operates to effect decompression of the still video data copied into the SDRAM 33, by using a decompression program prepared in the flash memory 34. The decompressed still video data is delivered to the MPEG decoding section 141 of the decoding section 14, through the BUS 31.

As stated before, the MPEG decoding section 141 has a so-called OSD function. The OSD function of the MPEG decoding section 141 is used to generate a signal that is used for reproducing a still image from the decompressed still video data. The signal formed by the OSD function of the MPEG decoding section 141 is supplied to the NTSC encoding section 14, so as to be converted into an analog output signal. This analog output signal is supplied to, for example, a monitor receiver, whereby the still image formed by the still video data obtained from the external memory element 100 is displayed on the display screen of the monitor receiver.

It is stated in the foregoing description that the decompression of the JPEG-compressed still video data in the external memory element 100 is effected by using a decompression program that corresponds to the JPEG compression technique and that has been prepared in the flash memory 34. In some cases, however, no decompression program corresponding to the JPEG technique is prepared in the flash memory 34.

In accordance with the present invention, therefore, the external memory element 100 may store the decompression program corresponding to the JPEG technique, together with the JPEG-compressed still video data.

When the decompression program has been stored in the external memory element 100, the controlling portion 30 first operates to copy this decompression program from the external memory element 100 into, for example, the SDRAM 33, so as to make this program executable in the receiver 3.

Then, the compressed still video data is read from the external memory element 100, and is decompressed by the decompression program that has been already read and stored in the SDRAM 33. The still video data thus decompressed is supplied to the MPEG decoding section 141 through the BUS 31, and the still image is reproduced from the still video data read from the external memory element 100, by the use of the OSD function of the MPEG decoding section 141.

The described embodiment also can be carried out by using, in addition to the external memory element that stores JPEG-compressed still video data, another external storage device that stores the decompression program corresponding to the JPEG technique. In this case, the external memory element storing the decompression program corresponding to the JPEG technique is connected first to the external memory interface 45, so that the decompression function corresponding to the JPEG technique becomes available on the receiver 3. Then, the other external memory element, i.e., the external memory element storing the JPEG-compressed still video data, is connected to the external memory interface 45, whereby the still image is reproduced from the still video data read from the external storage device.

The receiver 3 therefore can reproduce original information from compressed data regardless of the type of the compression, provided that the decompression program corresponding to the type of compression of the data to be subjected to the reproduction is stored in the external memory element 100.

The arrangement also may be such that a decompression circuit such as a JPEG decoder is loaded in the MPEG decoding section 141, so that the compressed data is decompressed by the decompression circuit so as to be used for reproduction.

Audio data corresponding to voice or sound at the time of recording of still image may be stored together with the still video data. In such a case, the arrangement may be such that the audio data undergoes a required processing such as decompression performed by the controlling portion 30, and is supplied to the audio signal D/A conversion circuit 144 through, for example, the MPEG decoding section 141, whereby the original voice or sound is reproduced.

[Transfer of Information from One External Memory Element 100 to Another]

A demand exists also for transferring information such as, for example, a still image stored in an external memory element 100 by a digital still camera to another external memory element, or to another storage medium by way of an external device.

The receiver of the described embodiment has a digital interface portion 20 as explained before. It is possible to externally output information stored in an external memory element 100 connected to the external memory interface 45, via the digital interface portion 20 and the I/O terminal 20T.

It is assumed here that an external memory element 100 storing still video data has been connected to the external memory interface 45. When a transfer instruction is given to the receiver 3 by the user, the still video data stored in the external memory element 100 is taken up by the receiver 3 through the external memory interface 45, and is temporarily stored in the SDRAM 33 of the controlling portion 30. The controlling portion 30 then operates so as to supply the digital interface portion 20 with the still video data that has been derived from the external memory element 100 and temporarily stored in the SDRAM 33.

The digital interface portion 20 trims the still video data supplied by the controlling portion 30 into still video data of a form that can be output through an IEEE-1394 interface, and externally outputs the trimmed still video data through the I/O terminal 20T.

A hard disk device (AVHDD), for example, is connected to the I/O terminal. The hard disk device operates so that the still video data derived from the external memory element 100 is stored in a hard disk (HDD).

It is thus possible to output, through the digital interface portion 20 and the I/O terminal 20T, the still video image stored in the external memory element 100 and to record the output data in an external storage medium. This feature enables the hard disk device to administrate all of a multiplicity of still video data stored in a plurality of external memory element.

Obviously, an output terminal serving as an output interface for delivery of data to external memory element may be provided in place of or in addition to the I/O terminal 20T. Using such an output terminal, it is possible to transfer still video image derived from one external memory element to another external memory element, thus storing the still video data in the second-mentioned external memory element.

Still video data has been specifically mentioned as the data to be read into the receiver 3 from the external memory element 100 connected to the external memory interface 45 and transferred externally of the receiver 3 via the digital interface portion 20. It will be clear, however, that other kinds of digital data such as audio data, programs and so forth can be transferred to another external memory or other type of external device, via the receiver 3.

Demand may exist for editing a so-called electronic album, by transferring to and storing in a hard disk only the still video data of images of interest selected from among a plurality of still video data stored in the external memory element 100.

To cope with such a demand, the receiver 3 of this embodiment is so configured as to enable only required still video data selected from among a plurality of still video data stored in the external memory element 100 to be transferred to an external device such as a hard disk device.

It is assumed here that an external memory element 100 having a plurality of still video data recorded therein has been connected to the external memory interface 45. When an at-a-glance display instruction is given by the user to the receiver 3, the still video data recorded in the external memory element 100 are read into the receiver 3 of this embodiment via the external memory interface 45, and is temporarily stored in the SDRAM 33 of the controlling portion 30.

Based on the plurality of still video data derived from the external memory element 100 and temporarily stored in the SDRAM 33, the controlling portion 30 operates so as to form an image data necessary for a at-a-glance display of the still images to be formed by the plurality of still video data.

The formation of the image data is conducted by using an at-a-glance display screen forming program that is stored in the external memory element 100 together with the still video data. This program is taken into the SDRAM of the controlling portion 30 and is executed thereby forming the image data to be used for the purpose of the at-a-glance display of the still images.

Obviously, this process may be modified such that the program for forming at-a-glance display of the still images is taken into the receiver 3 from an external memory element storing such a program, and still video data are taken up by the receiver 3 from another external memory element that contains such still image data. The program which has been read by the receiver 3 then operates so as to form the at-a-glance display screen, based on the still video data.

The image data, i.e., the at-a-glance display screen, formed by the controlling portion 30 and displaying the plurality of still images, is supplied to the MPEG decoding section 141 as described before, and still images are reproduced from the image data by the OSD function of the MPEG decoding section 141, whereby the at-a-glance display of the images formed by the still video data taken up from the external memory element 100 is performed.

After the display of the still images based on the still video data stored in the external memory element 100, the user selects the still images to be transferred, from among the images on the at-a-glance display screen. For instance, the selection is conducted by appointing or inputting a number allocated to the objective still images on the at-a-glance display screen, by means of the remote controller.

Upon receipt of the selection instruction given by the user, the receiver 3 extracts from the SDRAM 33 only the still video data that correspond to the still images designated by the user, and supplies the extracted still video data to the digital interface portion 20. Then, as described before, the digital interface portion 20 trims the still video data derived from the controlling portion 30 into a form that can be output through the IEEE-1394 interface. The trimmed still video data is then supplied to, for example, a hard disk device via the I/O terminal 20T.

It is thus possible to transfer to and store in the hard disk device only the still video data corresponding to the still images selected by the user, from among the plurality of still video data that are stored in the external video device 100 connected to the external memory interface.

When too many pieces of still video data exist in the external memory element 100, a single display screen may fail to display all the still images. In such a case, a plurality of at-a-glance display screens are formed and edited by so-called pagination, so that still images corresponding to all the still video data stored in the external memory element 100 are displayed for selection by the user. Consequently, the user can see all the still imaged and select favorite still images or still images of concern, so that only the still video data corresponding to the selected still images are extracted and transferred to another storage medium so as to be stored in the latter.

In the foregoing description, still video data is read by the receiver 3 from the external memory element 100 that stores the still video data recorded by, for example, a digital still camera, and is transferred by the receiver 3 to an external device. The data to be read and transferred by the receiver 3, however, is not limited to still video data. Thus, various kinds of digital data such as audio data, programs and so forth can be taken up from external memory elements 100 and transferred to external device.

Although the hard disk device is specifically mentioned as the external device, this is only illustrative and various kinds of digital devices may be used and connected to the receiver 3, such as a DVTR (Digital Video Tape recorder), an MD device that uses small-sized magnetic disks known as MD (Mini Disk), a floppy disk device, and so on.

In addition, it is possible to transfer digital data stored in an external memory element 100 connected to the receiver 3 via the external memory interface 45 to another external memory element, if the receiver is provided with an output interface for connection to such another external memory element as described before.

[Recording of Data in External Memory Element 100]

As will be understood from the foregoing description, the receiver 3 of this embodiment can extend or add to the function thereof, by reading various kinds of data read from an external memory element 100 that is connected thereto through the external memory interface. The receiver 3 also can reproduce original information from the thus read data.

In addition, the receiver 3 of this embodiment is designed so as to be able to write data in an external memory element 100 connected thereto through the external memory interface. For instance, the receiver 3 can write, in the external memory element 100, data such as various kinds of contents information provided by digital broadcasting service as described before, audio data compressed by, for example, ATRAC method, and so forth.

For instance, the contents information and ATRAC-compressed audio data are extracted by the demultiplexing section 132 of the transport section 13. The extracted data are supplied to the controlling portion 30.

The controlling portion 30 operates so as to cause the SDRAM 33 to temporarily store the data supplied from the demultiplexing section 132. When instruction for picking up data furnished by digital television broadcasting service is given by the user by means of, for example, a remote controller, the controlling portion 30 operates so as to cause the external memory element 100 to record the contents information and ATRAC-compressed audio data temporarily stored in the SDRAM 33 to be recorded in the external memory element 100.

Thus, the receiver 3 of this embodiment is configured so as to be able to record in the external memory element 100 various data that are provided by digital broadcasting service.

The arrangement is such that the data recorded in the external memory element 100 via the receiver 3 is usable whenever required, through the operation of the receiver 3 of this embodiment. Obviously, the data provided by the digital television broadcasting service and recorded in the external memory element 100 can be used on a suitable digital device that to which the external memory element 100 is connectable.

The user may wish to record a specific pictorial image out of images provided by the broadcast program which has been selected by the user and reproduced by the receiver 3 of this embodiment, e.g., a cookery recipe presented in a broadcast program pertaining to cooking.

In such a case, the usr given storage instruction through the remote controller of the receiver 3. For instance, in such a case, the video data available at the time when the storage instruction is given is supplied from the decoding section 14 to the controlling portion 30 so as to be stored in the SDRAM 3 of the controlling portion 30. The stored video data may be transferred to and recorded in the external memory element 100.

The receiver 3 of this embodiment can receive various kinds of digital data from external digital devices via the I/O terminal 20T and the digital interface 20. For instance, the receiver 3 can pick up data such as a program or video data stored in the hard disk and store the data in an external memory element 100 connected thereto through the external memory interface 45.

For instance, when data, e.g., still video data, is supplied from an external device, e.g., a hard disk device, connected to the I/O terminal 20T, the still video data from the hard disk device is temporarily stored in the SDRAM of the controlling portion 30.

The still video data temporarily stored in the SDRAM 33 is subjected to reproduction, as in the case of the reproduction of image from still video data picked up from the external memory element 100. The user observes the still image reproduced from the still video data. The user, if wishes to store the still image in the external memory element 100, gives a storage instruction to the receiver 3 by, for example, operating the remote controller of the receiver 3, whereby the still image is recorded in the external memory element 100.

More specifically, upon receipt of the storage instruction from the user, the controlling portion 30 operates so that the still video data of the still image specified by the storage instruction is sent through the external memory interface 45 from the SDRAM 33 to the external memory element 100. It is thus possible to store the still image of interest in the external memory element 100.

Obviously, the receiver 3 of this embodiment can be used to transfer to and store in the external memory element 100 whole data supplied to the receiver 3 from an external device via the I/O terminal 20T and the digital interface section 20.

The data to be recorded in the external memory element 100 may have been compressed by the controlling portion 30. To this end, an external memory element storing a compression program is connected to the receiver 3 of this embodiment, so as to add a data compressing function to the functions of the receiver 3, as explained before.

A description will now be given of the operation performed by the receiver 3 for executing processings corresponding to information provided by an external memory element 100 connected as an external memory to the external memory interface section 45, with reference to flowcharts shown in FIGS. 4 to 6.

Figure 4:
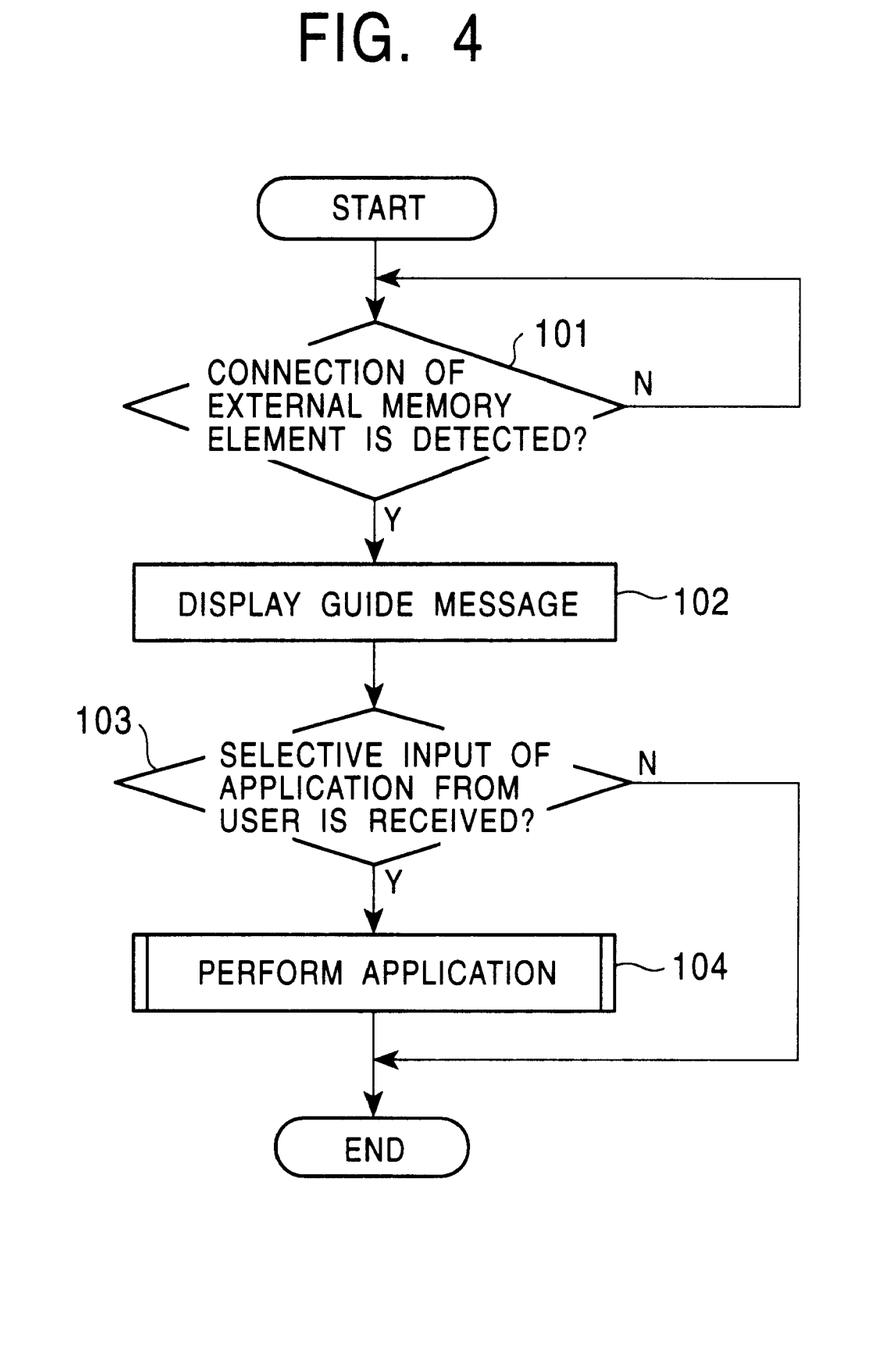
FIG. 4 is a flowchart explanatory of the operation performed by a controlling portion when an external memory is connected to an external memory interface.

FIG. 4 is a flowchart explanatory of the operation performed by the controlling portion 30 when the external memory element 100 is connected to the external memory interface 45. In this embodiment, the controlling portion 30 detects that the external memory element 100 has been connected to the external memory interface 45 (Step 101). The controlling portion 30 then determines the type of the data stored in the external memory element 100, based on, for example, header information carried by the external memory element 100 and displays a corresponding message (Step 102).

For instance, if the external memory element 100 connected to the external memory interface section 45 has a browser program stored therein, a message reading "EXECUTE BROWSER FUNCTION?", is displayed for example. Similarly, if the external memory element 100 stores still video data recorded by a digital still camera, a message reading "REPRODUCE STILL IMAGE?" is displayed.

The controlling portion 30 then waits for a selection input as to whether the processing corresponding to the data stored in the external memory element 100 is to be executed (Step 103). The user then inputs selection instruction through, for example, the remote controller of the receiver 3 of this embodiment. The processing corresponding to the data stored in the external memory element 100 is executed, if the selection instruction given by the user requests execution of the processing (Step 104).

However, if the determination in Step 103 has proved that the selection instruction does not select the execution of the processing corresponding to the data stored in the external memory element 100, the process shown in FIG. 4 is terminated without executing the processing corresponding to the data stored in the external memory element 100.

Thus, the receiver 3 of this embodiment employs a so-called plug-and-play technique, so that processing corresponding to data stored in the external memory element 100 is executed simply by connecting the external memory element 100 to the external memory interface 45 and performing a simple selection input operation, without requiring any complicated operation.

Figure 5:
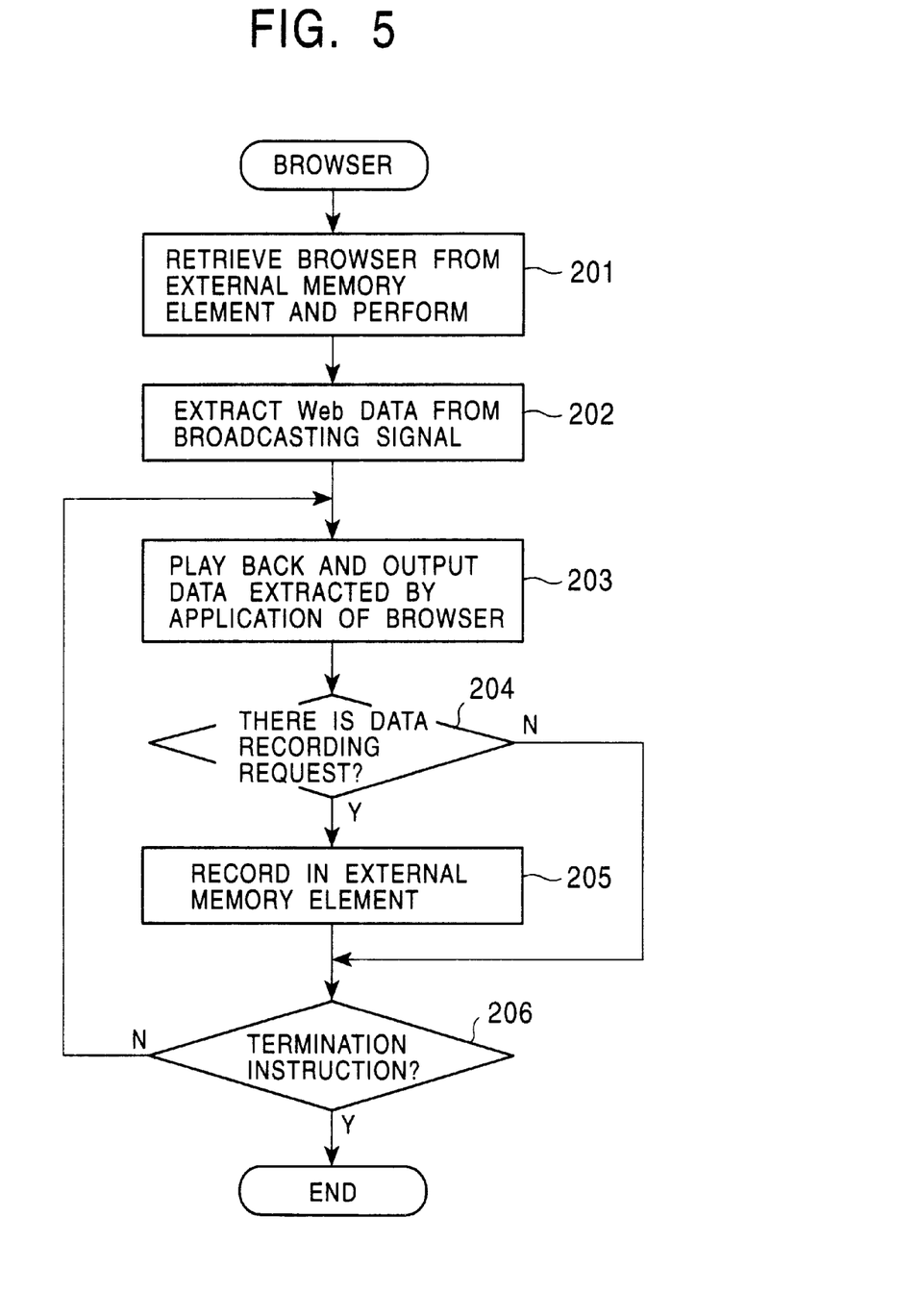
FIG. 5 is a flowchart illustrative of a processing that is conducted in a case where a browser for utilizing contents information is stored in the external memory.
Figure 6:
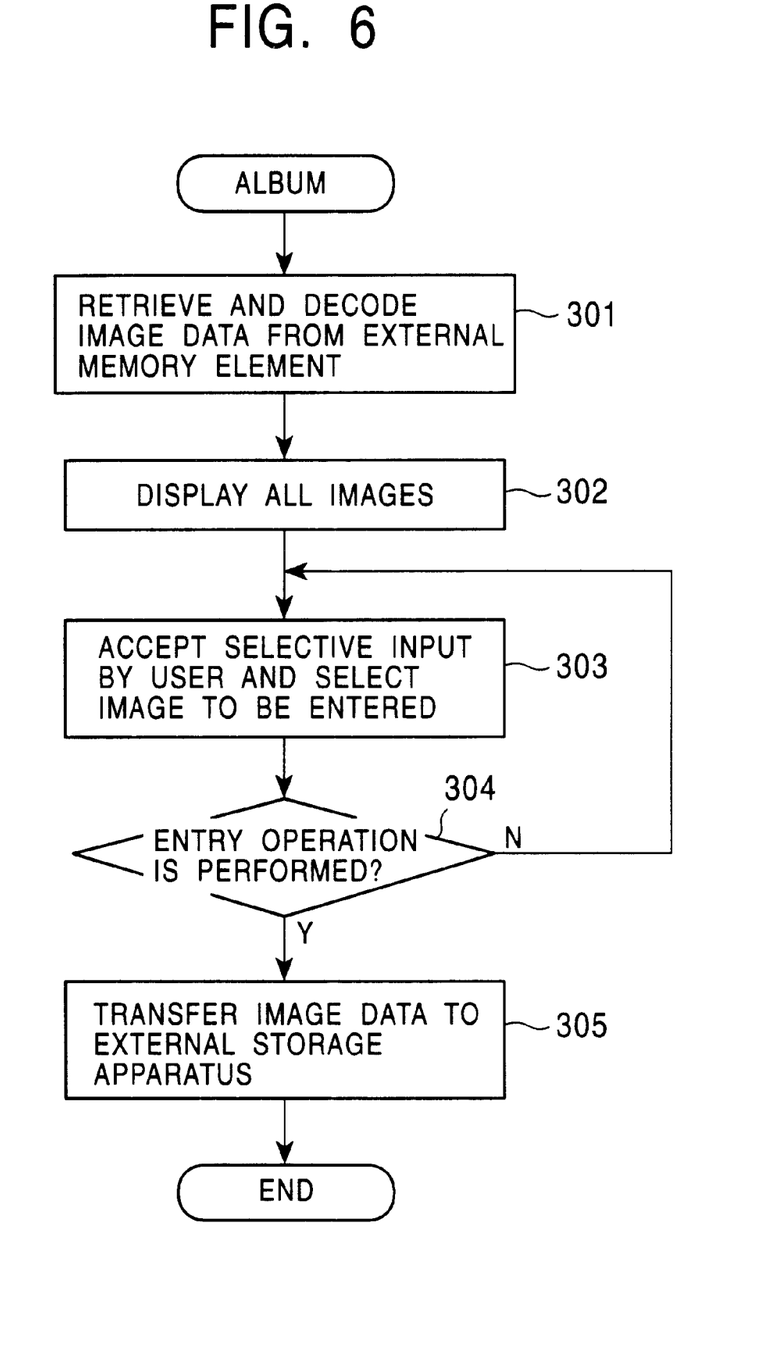
FIG. 6 is a flowchart showing a process which is conducted for the purpose of forming a so-called electronic album in a storage medium of an external device by transferring to the external device a plurality of still image data stored in the external memory.

FIGS. 5 and 6 show flowcharts illustrating, by way of example, processings to be performed in Step 104 of the flow shown in FIG. 4, corresponding to the data stored in the external memory element 100.

More specifically, FIG. 5 shows processings to be executed when the external memory element 100 stores a browser program for enabling use of contents information supplied by a digital television broadcasting service. FIG. 6 shows processings for transferring a plurality of still video data from an external memory element 100 to an external device so as to form a so-called electronic album in a recording medium used on the external device.

A description will be given first of the processing performed when the external memory element 100 connected to the external memory interface 45 stores a browser program, with specific reference to FIG. 5.

As explained before in connection with FIG. 4, if the instruction given by the user requests execution of the browser function stored in the external memory element 100, the browser program stored in the external memory element 100 is copied into, for example, the SDRAM 33 so as to be executed (Step 201).

The controlling portion 30 then controls various parts of the receiver such the transport section, so as to extract the contents information from the broadcast signals and stores the extracted contents information temporarily in the SDRAM 33 (Step 202). The contents information temporarily stored in the SDRAM 33 is processed so as to be subjected to reproduction by the browser that has been copied into the SDRAM 33 in a state ready for execution. The data subjected to the reproduction is then processed by the OSD function of the MPEG decoding section 141, whereby video signals and audio signals corresponding to the contents information are output from the output terminals 15 and 16 so as to be presented to the user through the monitor receiver (Step 203).

The user may find it necessary to store the contents information after observing the information presented in the form of image and voice or sound. To comply with such a request, the controlling portion 30 receives instruction from the user and determines whether the user's instruction requests recording of the contents information (Step 204).

Upon determining that a recording request has been given by the user, the controlling portion 30 operates so that the requested contents information is recorded in a vacant area of the external memory element 100 that has been connected to the external memory interface 45 (Step 205).

Conversely, when the determination in Step 204 has proved that there is no recording request, or when the recording processing in Step 205 has been finished, the controlling portion 30 determines whether or not a browser terminating instruction has been input by the user (Step 206). If determination in Step 206 has proved that browser terminating instruction has not been input, Steps 203 onwards are executed repeatedly.

However, if input of browser terminating instruction is confirmed in the determination made in Step 206, the process shown in FIG. 5 is terminated.

The browser function which is not available initially on the receiver 3 of this embodiment can be implemented by virtue of the use of the external memory element 100.

In this embodiment, vacant space in the external memory element 100 is utilized as the space for recording the contents information used by the browser function enabled by the external memory element 100, when such recording is necessary. The contents information, when required to be recorded, may also be stored in a recording medium of an external device which is supplied with the contents information via the digital interface section 20 and the I/O terminal 20T.

Thus, the receiver of this embodiment may be arranged to enable selection between a mode in which the contents information is recorded in an external memory element connected to the external memory interface 45 and a mode in which the contents information is supplied to the external device through the digital interface section 20 and the I/O terminal 20T and stored in the recording medium of the external device, when a demand exists for recording the contents information.

A description will now be given with reference to FIG. 6 as to the processings in which a plurality of still video data stored in the external memory element 100 connected to the external memory interface 45 are transferred to an external device, for the purpose of forming a so-called electronic album in the recording medium of the external device.

As explained before in connection with FIG. 4, when instruction has been given by the user for rearranging still video data stored in the external memory element 100 to form an electronic album, the controlling portion 30 operates so that the still video data stored in the external memory element 100 are taken into the SDRAM 33 through the external memory interface 45, whereby the still video data are decoded by means of, for example, a decompression program prepared in the flash memory 34 (Step 301).

Then, a plurality of still images formed of the plurality of decoded still video data are displayed in an at-a-glance fashion (Step 302). Subsequently, the controlling portion 30 accepts a selection input made by the user for appointing still images that the user wish to transfer to the external device, and selects the still video data corresponding to the still images appointed by the user (Step 303).

Then, the controlling portion 30 determines whether an operation has been made by the user for executing registration (Step 304). The controlling portion 30, when it has determined that no registration executing operation has been made by the user, repeats Steps 303 onwards, so as to accept selection of the still images to be transferred to the external device, thus continuing selection of the still video data that form the selected still images.

When it has been determined in Step 304 that the registration executing operation has been made by the user, the controlling portion 30 operates so that the selected still video data are supplied to an external device such as a hard disk device, through the digital interface section 20 and the I/O terminal 20T (Step 305).

Consequently, only the required still video data selected from among a plurality of still image data stored in the external memory element 100 is transferred to the external device and are recorded in the recording medium of the external device, whereby an electronic album is formed.

Thus, the receiver 3 of this embodiment has a large versatility to adapt itself to a variety of tasks by the use of the external memory element 100 connected to the external memory interface 45. Examples of such tasks are: addition of a function that is not initially available on the receiver 3; extension of an existing function on the receiver 3; reproduction of images and sounds from video data and audio data recorded in the external memory element 100; transfer of information stored in the external memory element to another external memory or an external device; recording in the external memory element 100 of various kinds of data provided by digital television broadcasting services; and recording in the external memory element 100 of data brought from another external memory element or an external device.

By virtue of these features, the user can enjoy any new type of service rendered by a digital television broadcasting business, by using an external memory element that stores a program that is designed to adapt the receiver to such a new type of service.

The receiver 3 also can be used for the purpose of reproducing and outputting information formed by various types of data stored in external memory elements by means of a variety of types of digital devices, and can be used also for transferring such data to another external device, thus improving the environment and utility of digital data.

Various types of external memories that can be detachably connected to the connector of the external memory interface in the receiver may be used as the external memory element, such as a so-called memory stick loaded with a flash memory, a card memory, e.g., an IC card, and so forth.

In the foregoing description, the external memory element is designed so as to be detachably connectable to the receiver and so as to permit updating or rewriting of data. This, however, is not essential and, if there is no need for rewriting or updating the data in the external memory element with data provided by the receiver, the external memory element may be a ROM (Read Only Memory) that stores a program or data to be used on the receiver.

Further, although a receiver for geostationary satellite digital broadcasting service has been specifically mentioned in the foregoing description, the invention can also be applied to other types of receiver. Thus, the addition of function by the use of an external memory element, reproduction of image and sound information from video and audio data stored in the external memory element, and other advantageous features of the invention can equally be implemented on other type of receiver such as ordinary television receiver for ground wave television broadcasting. Further, the present invention may be incorporated in receivers that are used for analog broad casting services that use a geo-stationary satellite.

What is claimed is:

1. A television receiver apparatus, comprising:
   a tuner operable to receive a transmitted signal; an external memory unit having a semiconductor non-volatile memory operable to store information and being detachably connectable to the television receiver apparatus by a user;
   a non-volatile memory operable to store executable programs that are capable of controlling the television receiver apparatus;
   a volatile memory operable for use as a temporary memory space for various processes; and
   a controller operatively coupled to the tuner, the external memory unit, the non-volatile memory, and the volatile memory, the controller being operable to control operation of the television receiver apparatus by executing the executable programs that are stored in the non-volatile memory, wherein:
   the external memory unit is operable to store a new executable program,
   the new executable program is copied into the volatile memory when the external memory unit is coupled to the television receiver apparatus by the user, and the new executable program is executed by the controller causing the television receiver apparatus to perform a new function, and
   the new executable program is not retained in the volatile memory when the television receiver apparatus is turned off.

2. The television receiver apparatus according to claim 1, wherein the non-volatile memory is a flash memory and the volatile memory is an SDRAM.

3. The television receiver apparatus according to claim 1, wherein:
   the external memory unit is operable to store compressed data and the new executable program is a decompression program for decoding the compressed data, and
   the decompression program is copied into the volatile memory when the external memory unit is coupled to the apparatus by the user, and the decompression program is executed by the controller causing the television receiver apparatus to decode the compressed data in the external memory unit, and
   the decompression program is not retained in the volatile memory when the receiver is turned off.

4. The television receiver apparatus according to claim 3, wherein the compressed data is image data.

5. A television receiver apparatus, comprising:
   a tuner operable to receive a transmitted signal;
   an external memory unit having a semiconductor non-volatile memory operable to store information and being detachably connectable to the apparatus by a user;
   a non-volatile memory operable to store executable programs that are capable of controlling the television receiver apparatus;
   a volatile memory operable for use as a temporary memory space for various processes; and
   a controller operatively coupled to the tuner, the external memory unit, the non-volatile memory, and the volatile memory, the controller being operable to control operation of the television receiver apparatus by executing the executable programs that are stored in the non-volatile memory, wherein:
   the controller is operable to cause (i) data received by the tuner to be at least temporarily stored in the volatile memory, (ii) the data to be compressed, and (iii) the compressed data to be transferred to the external memory and stored in the semiconductor non-volatile memory thereof.

6. The television receiver apparatus according to claim 5, wherein the compressed data is image data.

7. The television receiver apparatus according to claim 5, wherein:
   the external memory unit is operable to store a compression program, and
   the compression program is copied into the volatile memory when the external memory unit is coupled to the apparatus by the user, and the compression program is executed by the controller causing the compression of the data in the volatile memory.

8. The television receiver apparatus according to claim 7, wherein the compression program is not retained in the volatile memory when the receiver is turned off.

9. A television receiver apparatus, comprising:
a tuner operable to receive a transmitted signal;
an external memory unit having a semiconductor non-volatile memory operable to store information and being detachably connectable to the television receiver apparatus by a user;
a non-volatile memory operable to store executable programs that are capable of controlling the television receiver apparatus;
a volatile memory operable for use as a temporary memory space for various processes; and
a controller operatively coupled to the tuner, the external memory unit, the non-volatile memory, and the volatile memory, the controller being operable to control operation of the television receiver apparatus by executing the executable programs that are stored in the non-volatile memory, wherein:
the information in the external memory unit is copied into the volatile memory when the external memory unit is coupled to the apparatus by the user, and
the controller generates a list of the information for display.

10. The television receiver apparatus according to claim 9, wherein:
a program operable to generate the list of information is stored in the external memory unit, and
the program is copied into the volatile memory and executed by the controller when the external memory unit is coupled to the apparatus by the user.

11. The television receiver apparatus according to claim 10, wherein the program is not retained in the volatile memory when the television receiver apparatus is turned off.

12. The television receiver apparatus according to claim 10, wherein the information is a plurality of image data.

13. A method, comprising:
receiving a transmitted signal at a television receiver apparatus;
storing executable programs that are capable of controlling the television receiver apparatus in a non-volatile memory of the television receiver apparatus;
storing a new executable program in an external memory unit, the external memory unit having a semiconductor non-volatile memory operable to store information and being detachably connectable to the television receiver apparatus by a user;
coupling the external memory unit to the television receiver apparatus;
copying the new executable program from the external memory unit into a volatile memory of the television receiver apparatus when the external memory unit is coupled to the television receiver apparatus;
executing the new executable program using a controller that is operatively coupled to the tuner, the external memory unit, the non-volatile memory, and the volatile memory, such that the controller causes the television receiver apparatus to perform a new function; and
not retaining the new executable program in the volatile memory when the television receiver apparatus is turned off.

14. The method according to claim 13, wherein the non-volatile memory is a flash memory and the volatile memory is an SDRAM.

15. The method according to claim 13, wherein the new executable program is a decompression program for decoding compressed data, the method further comprising:
storing compressed data in the external memory unit;
copying the decompression program into the volatile memory when the external memory unit is coupled to the television receiver apparatus;
executing the decompression program using the controller such that the receiver decodes the compressed data in the external memory unit; and
not retaining the decompression program in the volatile memory when the television receiver apparatus is turned off.

16. The method according to claim 15, wherein the compressed data is image data.

17. A method, comprising:
receiving a transmitted signal at a television receiver apparatus;
storing executable programs that are capable of controlling the television receiver apparatus in a non-volatile memory of the television receiver apparatus;
temporarily storing data received from the transmitted signal in a volatile memory of the television receiver apparatus;
compressing the data temporarily stored in the volatile memory using a controller, the controller being operable to control operation of the television receiver apparatus by executing the executable programs that are stored in the non-volatile memory; and
transferring the compressed data to an external memory unit, the external memory unit having a semiconductor non-volatile memory operable to store the compressed data and being detachably connectable to the television receiver apparatus by a user.

18. The method according to claim 17, wherein the compressed data is image data.

19. The method according to claim 17, further comprising:
storing a compression program in the external memory unit;
copying the compression program into the volatile memory when the external memory unit is coupled to the television receiving apparatus by the user; and
executing the compression program using the controller such that the data stored in the volatile memory are compressed.

20. The method according to claim 19, further comprising not retaining the compression program in the volatile memory when the television receiver apparatus is turned off.

21. A method, comprising:
receiving a transmitted signal at a television receiver apparatus;
storing executable programs that are capable of controlling the television receiver apparatus in a non-volatile memory of the television receiver apparatus;
storing information from the transmitted signal in an external memory unit, the external memory unit having a semiconductor non-volatile memory operable to store the information and being detachably connectable to the television receiver apparatus by a user;
coupling the external memory unit to the television receiver apparatus;
copying the information from the external memory unit into a volatile memory of the television receiver apparatus when the external memory unit is coupled to the television receiver apparatus; and generating a list of the information using a controller that is operatively coupled to the tuner, the external memory unit, the non-volatile memory, and the volatile memory, such that the list may be displayed.

22. The method according to claim 21, further comprising:

storing a program operable to generate the list of information in the external memory unit, and copying the program into the volatile memory and executing the program using the controller when the external memory unit is coupled to the apparatus by the user.

23. The method according to claim 22, further comprising not retaining the program in the volatile memory when the television receiver apparatus is turned off.

24. The method according to claim 22, wherein the information is a plurality of image data.

* * * * *